June 9, 1936.                G. PAPP                2,043,809
METHOD OF MAKING CUT EMBOSSING STOCK SHEETS AND ARTICLE OF MANUFACTURE
Filed Feb. 24, 1932
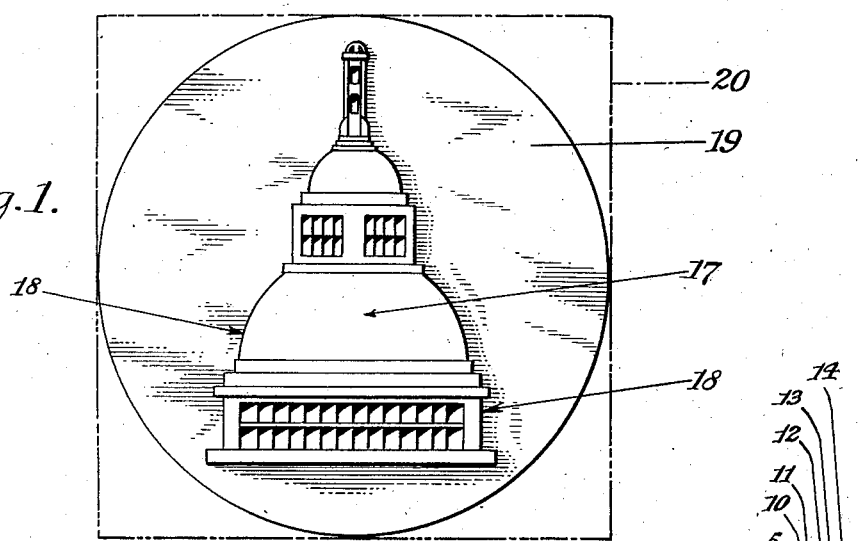
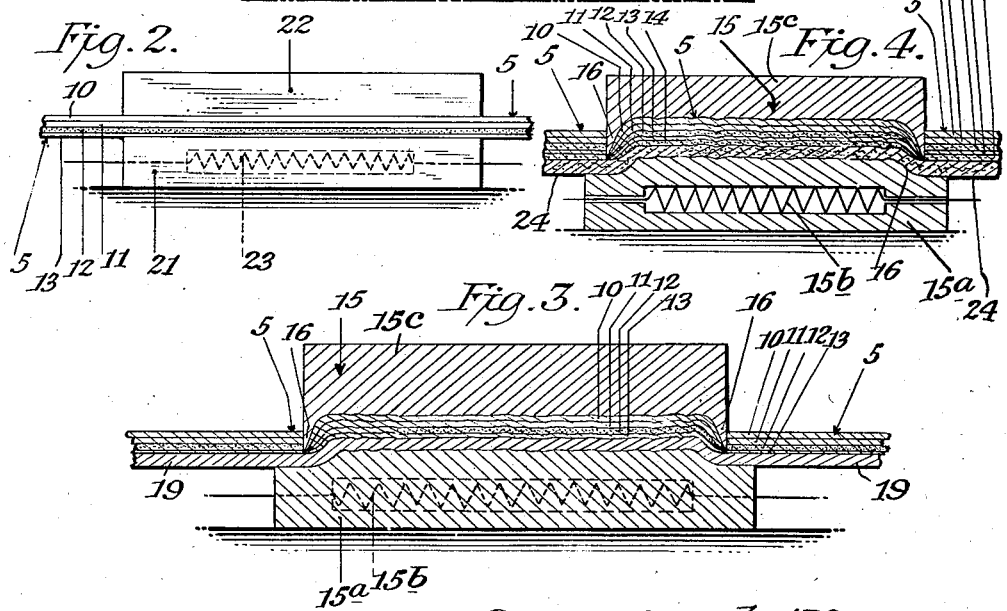
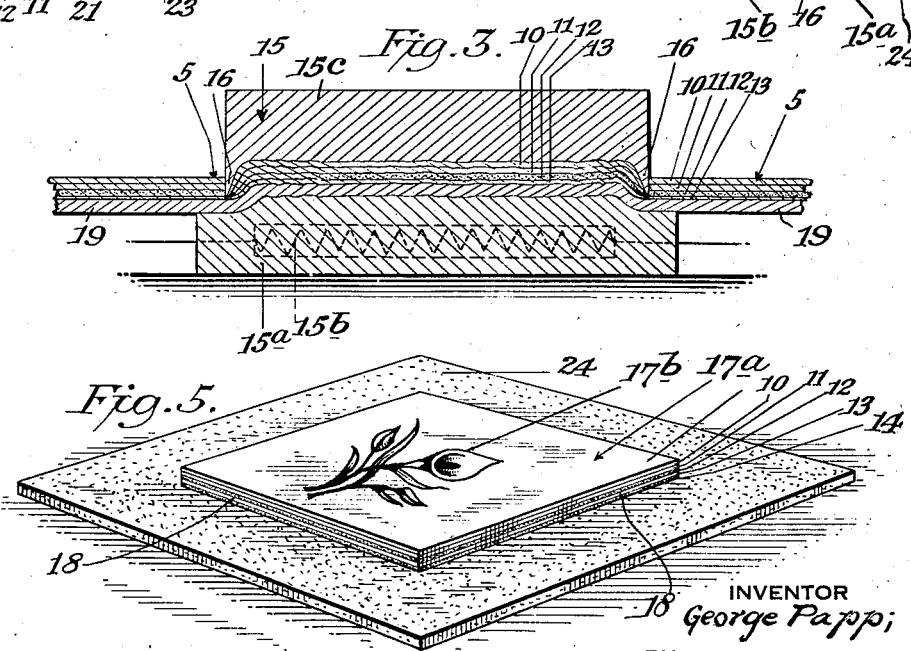
INVENTOR
George Papp;
BY
Harold D. Penney, ATTORNEY.

Patented June 9, 1936

2,043,809

UNITED STATES PATENT OFFICE 2,043,809

METHOD OF MAKING CUT-EMBOSSING STOCK SHEETS AND ARTICLE OF MANUFACTURE

George Papp, Astoria, N. Y., assignor to Peters Bros. Rubber Company, Inc., Brooklyn, N. Y.

Application February 24, 1932, Serial No. 594,824

20 Claims. (Cl. 154—2)

The present invention contemplates the provision of a composite or laminary sheet of various materials, and comprises a method and article of manufacture, possessing certain characteristics of flexibility, partial permeable adhesion to materials and tensile strength from which decorative, or ornamental designs, emblems, or figures may be formed and simultaneously attached by adhesion to the faces of cards, book covers, panels, plaques and other base supports, preferably having yielding faces.

An object of the invention is to produce a stock sheet of the above described character or type, having appropriate flexibility and including resisting means effective for coacting operation with a cutting element for achieving a clean separation of the determined emblem from the stock sheet at the time said emblem is sealed or attached to a base support.

A further object of the invention is to provide an integral, composite sheet of flexible laminae formed by coating an ornamental sheet with a plurality of flexible coatings or films each film having certain advantageous qualities and characteristics for use in connection with embossing or inscribing devices for forming ornamental emblems, and cutting means simultaneously operable and coactive with a distinctive shearing material of a layer in the stock sheet, for effecting a clean separation of the ornamental emblems from the said stock sheet for producing clean cut marginal edges on said emblems.

A further object of the invention is to provide means in a composite stock sheet of the character described, as an article of manufacture, for causing emblems formed therefrom, to be securely and fixedly applied to bases of a yielding and plastic material heretofore found impossible of permanent attachment.

In carrying out my invention it is proposed to provide a method of forming a stock sheet for the purposes above set forth by providing a face or outer layer consisting of an appropriate deformable and flexible sheet or layer of metallic foil or the like, under and to which is adhesively connected a sheet or layer of fibrous material such as paper; to the bottom face of said paper I may apply a film or coating of quick drying glue, gum arabic, shellac or the like, which when set, provides a hard, semi-brittle yet flexible sheet of material resistible to an extent to cutting thrusts, into edges acting as shearing faces operating in connection with a cutter as it passes through the stock sheet for effecting a clean separation of the finished ornamental emblem from the stock sheet; and to insure perfect cohesion of the emblem to the yielding base.

The method of forming the stock sheet is continued by applying a layer of unvulcanized rubber tissue or the like to the said hard shearing layer.

The method of forming the improved stock sheet is completed by subjecting said sheet to pressure in the presence of a low heat temperature, but this last step of pressing with low heat is not essential and may be omitted. In some cases the various films may be coated on by spraying or rolling on, and thereafter drying under atmospheric condition, or artificial drying conditions.

For use under some conditions such as in connection with leather bases and the like, or in some cases, a metal foil base, it is desirable to form the stock sheet with a fifth laminae or layer to be applied over the unvulcanized rubber tissue and this layer may be constituted by a film of a quick drying and hardening substance, such as glue, shellac or gum-arabic such as the shearing layer above described, and this last or bottom layer will also act as a shearing layer to ensure the severance of the said adhesive rubber tissue at the edges of the emblem to be cut out of the stock sheet, and increase the adhesiveness of the cut design, to leather, the finished surface of which is generally of a non-adherent nature, due to its treatment during manufacture, and to also increase the adhesiveness of the completed embossing laminae when applied to surfaces of non-permeable nature, such as a metal foil or a gilded surface.

The material of the improved stock sheet as a whole is capable of receiving and retaining an embossed impression of any design or character desired.

In the accompanying drawing:

Fig. 1 is a face view of a base or panel upon which an ornamental emblem is formed and cut from the improved stock sheet, the edges of said emblem being sharply clean cut and outstanding.

Fig. 2 is a side elevation of the improved stock sheet showing, in one form of manufacture, the last step in its formation by applying pressure in the presence of low heat for causing the laminae thereof to permanently cohere to form an integral article of manufacture.

Fig. 3 is a cross-sectional elevation showing an embossing cutter die, in the position of forming and cutting an emblem from the improved stock sheet.

Fig. 4 is a view similar to Fig. 3 but showing a modified form of stock sheet in which a fifth layer consisting of hard brittle material is provided for aiding in attaching the emblem to leather and other materials having impervious or adhesive resisting facing surfaces.

Fig. 5 is a perspective view showing a five layer inscribed emblem attached to a base of leather or the like, part of the emblem being left unembossed.

In Figs. 1, 2 and 3, the stock sheet is shown as being formed of four different layers or laminae which are assembled by superposing one over the other to form an integral article of manufacture, and to this end, as in Figs. 2 and 3, the top sheet or layer may be either an enameled sheet of thin paper, or the paper may be printed with suitable colorings or designs, or this top sheet may be of thin metal foil.

Referring now to the drawing in detail, the method of assembling the various laminae or layers of the stock sheet, may be described as follows: the said metal foil or face sheet 10 is directly combined on its rear face with a thin paper film, sheet or layer 11, by any suitable process, the paper being very thin and tough and constituting a reenforcement, but adding very little thickness to the combined paper 11 and foil sheet 10.

After this combination, a coating of some suitable hard drying gum material 12, such as glue or shellac or gum arabic, is applied to the paper and which is permitted to dry; after which a thin coating or tissue of unvulcanized rubber 13 is applied to the hard coating 12, thus forming a stock or embossing sheet which comprises three separate backings upon the ornamental facing or foil sheet 10.

In some instances, as will be pointed out later, a final hard drying gum coating 14, may further be applied to the unvulcanized rubber tissue 13, for special uses, as in connection with leather or other impervious bases. In this form of stock sheet, there are four separate backings upon the ornamental or foil sheet 10.

The following statements apply more specifically to the stock sheet having three backing laminae or layers on the facing sheet and each of the said layers have respectively the following functions:

The facing or foil sheet 10 forms the deformable ornamental embossing surfaces which takes and retains the imprint of an embossing die 15 thereon. It may have a polished, matt or colored finish. The attached paper backing 11 therefor, retains the foil in its uncoated condition and supports the same in a condition for rolling and rerolling during its use and reenforces the foil against tearing strains, and further, forms a deformable support backing adjacent to the said foil. The coating or layer 12, as applied over the paper forms a hard, brittle resisting backing which becomes deformable when heat is applied but at points where there is no heat is brittle and forms an ideal clean cutting, shearing plate or layer operating coactively with the cutting edges 16, of the embossing die 15 when severing an ornamented emblem from the stock sheet 5, thus achieving clean cut edges on the ornamental emblem, without fraying at the edges, after which the unused and unheated portions of the stock sheet are easily and cleanly removed.

The third backing layer 13 being a thin coating of unvulcanized rubber forms a soft adhesive deformable cushion and filler whereby during the embossing action, in the presence of heat in the embossing cutter dies, will cause the said unvulcanized rubber coating to flow through the backing layers of the stock sheet and form a heat softening filler sufficiently plastic to be deformed and to firmly retain the embossed design or emblem upstanding on the surface upon which it is cut-impressed.

The use of the brittle flexible layer coating 12 upon the rear surface of the ornamental embossing sheet, has the distinct advantage of making the said embossing sheet easy to cut clean at the contouring edges of the desired design, without requiring too much pressure on the embossing sheet and the base upon which the design is being impressed, and, therefore, does away with the tendency of the base, upon which the design is being cut-impressed from being itself cut, which often happens when only a soft plastic backing is used on the embossing sheet. In other words the use of a brittle, hard coating between the soft adhesive coating 13, and the ornamental embossing sheet allows said sheet, especially if it is a metal foil to be cut clean and with less pressure than if the brittle cutting coating were not used.

All coatings herein described may be liquid and may be applied by spraying or rolling them on to the back of the embossing sheet by known methods.

When attempting to emboss emblems on natural or artificial leather, the finished surfaces thereof are at times found to be impervious or greasy and highly polished and therefore do not hold to the adhesive rubber tissue as readily as would some other form of adhesive.

The solution of this problem is found in employing the above described five ply stock sheet with the added underlayer of the hard gum material 14. This form of stock sheet may also be used when it is desired to emboss a metallic foil emblem of a desired color or shade upon a metallic foil base of another color or shade, wherein said base foil is impervious, with a brilliant surface and requires a special adhesive material to make the embossed emblem adhere permanently thereto. This may be accomplished, as stated, by the foil sheet form having the second gum coating 14, above described, and which covers the surface of the vulcanized tissue surface 13.

The foil sheet form just identified, is also an excellent means for causing permanent adhesion of the foil emblem to bright metallic or lacquered surfaces and the like.

Therefore it is to be seen that the improved stock or embossing sheet, from which emblems may be formed and cut, partakes of two modifications, one is without the final coating 14, and the other is with the said final coating 14.

The materials used in the layers, films or sheets backing the facing plate or foil to collectively form the improved stock or foil sheet, are of a nature that becomes slightly plastic in the presence of heat, and which during the compression action of the embossing cutter die, are caused to deform, to become sticky and to act as a filler between the surface being embossed and the surface of the base to which the emblem so formed is applied, thus causing a relief effect of the embossed portion. During the said compression action, the individual members of the stock sheet 5, Figs. 3 and 4, are pressed at their outer margins into a single unitary boundary edge, beneath the edge 16, and the first edge also becomes practically unitary with the base 19 or 24, and securely fixed thereto, when the heat is reduced and the embossing apparatus removed.

In Fig. 1, there is illustrated an ornamental emblem 17, embossed by the die 15, and having clean cut edges 18 formed by the marginal cutters 16, of said die acting in shearing contact with the edges of the normally hard shearing plate or layer 12 of the stock sheet.

The cut-out embossed emblem 17 in Fig. 1, is shown attached to a base panel 19, which is shown circular in form, but it may be of any desired form such as square as indicated by dot-dash lines at 20.

In one method of forming the improved laminated stock sheet, a drier and presser may be employed such as shown in Fig. 2, and may comprise lower and upper presser plates 21 and 22, and one or both of these plates may be provided with heaters if desired, one heater being shown at 23, to assist in the drying operation, said plates 22 and 23 acting as a press to permanently unite the several layers and form the integral stock sheet 5, as an article of manufacture.

The work of producing cards, panels and the like, from the improved stock sheet may be readily done in a simple printing press or stamping press having enough strength to produce the desired impression or decoration, such as the so called "kick press" and in which, upon the fixed bed of the press may be mounted the female part 15a of the die, having an electric heating means 15b therein or thereon, as in Figs. 3 and 4, and upon the moving bed may be mounted the male part 15c of the embossing cutter die 15.

When the male die part 15c is moved toward the stationary heated female die part 15a in an embossing operation to impress an ornamental design upon the face of the embossing sheet, the emblem is first severed by the coactive shearing contact of the die cutter and the hard layer 12 of the embossing sheet, after which, heat from the male or female die makes plastic only that portion of the design that is within the contour of the emblem to be embossed thereon, thus when the embossing pressure is removed, the separated emblem, flat pieces or plaques may be put on any material and these flat pieces may then be printed or lithographed and firmly attached to the base 19 and outstanding in relief.

In Fig. 5, an emblem 17a, is shown mounted on a base of leather 24, or the like and an embossed or inscribed Figure 17b is shown on the emblem 17a, this being another example of ornamentation.

It will be understood that in the drawings some of the parts are greatly exaggerated for sake of clearness and changes may be resorted to in the embossing sheet materials and in the relative arrangement of the layers thereof within the scope of the invention claimed.

It is to be understood that by the use of the words "unvulcanized rubber tissue" in the foregoing description or the claims, that this term may include the use of a coating of gutta percha as a full equivalent in functioning as a heat plastic adhesive.

Further, in some instances where a foil sheet is heavier than usual, the paper backing may be left off and the adhesive and brittle laminae may be placed directly on the back of the foil, with desired final results.

What I claim is:

1. As an article of manufacture, a laminated embossing sheet for the purpose set forth, comprising in combination, a facing sheet; a reenforcing backing sheet of fibrous material; a second backing coating of hard semi-brittle material, a third backing coating of unvulcanized rubber, and a fourth or rear backing coating of a hard flexible material similar to the said second backing coating, the whole forming a thin flexible embossing sheet of high tensile strength.

2. The method of forming an embossing sheet from which emblems may be embossed and severed by a heated embossing cutter die; comprising the providing of a facing sheet of metal foil; applying in any manner to the back of the facing sheet a layer of tough paper; coating this paper with a hard drying gum; coating this hard coating of gum with a coating of unvulcanized rubber tissue; and finally coating said rubber tissue with a second layer of hard drying gum.

3. The method of forming an embossing sheet from which emblems may be embossed and severed by a heated embossing cutter die; comprising the providing of a facing sheet of metal foil; applying in any manner to the back of the facing sheet a layer of tough paper; coating this paper with a hard drying gum; coating this hard coating of gum with a coating of unvulcanized rubber tissue; and finally coating said rubber tissue with a second layer of hard drying gum.

4. The method of forming an embossing sheet from which emblems may be embossed and severed by a heated embossing cutter die; comprising the providing of a facing sheet of deformable material; applying in any manner to the back of the facing sheet a layer of tough paper; coating this paper with a hard drying gum; coating this hard coating of gum with a coating of unvulcanized rubber tissue; and finally coating said rubber tissue with a second layer of hard drying gum.

5. As an article of manufacture, a laminated embossing sheet for the purpose set forth, comprising in combination a facing sheet; a reenforcing backing sheet of fibrous material; a second backing coating of hard semi-brittle material, and a third backing coating of unvulcanized rubber, the whole forming a thin flexible embossing sheet of high tensile strength.

6. A method of forming an adherent embossing sheet from which emblems may be embossed and severed by an embossing cutter die; comprising the providing of a facing sheet of metal foil; applying to the back of said facing sheet a layer of tough paper; coating the paper with a hard drying gum; and then coating the hard coating of gum with a layer of unvulcanized rubber.

7. A laminated sheet of the class described from which portions may be severed by a cutting die for attachment to a base, said sheet including in combination a metal foil facing layer, a fibrous backing layer attached thereto, and a layer of brittle adhesive material cooperating with said fibrous layer, so that the die may cut the two first mentioned layers and substantially deform said brittle layer beneath the line of the cut, whereby the edges of the two first mentioned layers may be urged downwardly to substantially embrace said brittle layer around said line, said adhesive layer being adapted to be attached to a base.

8. A composite sheet from which portions may be severed with a heated cutting die to form ornamental articles for attachment to a base, said sheet including in combination a metal foil facing layer, a backing layer of thin tough paper, and a coat of hard brittle adhesive material, so that the edges of the die may first cut through said layers, said material then acting as an anvil before the heat takes effect below the paper and the material then becoming broken below the cut edges of the layers, the margins of said layers being urged downwardly at the cuts to embrace said material on the broken line, so that when the heat takes effect the embraced parts may become unitary, said adhesive coat being adapted to be attached to a base.

9. A method of forming a composite sheet, said method including the steps of providing a facing sheet of embossable metal foil; applying a layer of thin paper to the back of said sheet; coating the paper with a brittle adhesive which is embossable where heated and is brittle when cool; coating the adhesive coat with unvulcanized rubber, thereby forming a composite sheet.

10. A composite sheet from which portions may be severed with a heated cutting die to form ornamental articles, said sheet comprising in combination a relatively heavy facing sheet of metal foil, and a backing coat of hard brittle gum therefor; so that the edges of the die may first cut through said layer and break the gum on the line of the cut, said coat first acting, before the heat reaches it, as an anvil, and the boundary edge portion of the foil being urged downwardly to embrace the gum substantially on the broken line; whereby when the heat takes effect the gum may be softened to become unitary with said edge portion.

11. A composite sheet from which portions may be severed with a heated cutting, embossing die, said sheet comprising in combination a facing sheet of metal foil, and a backing coat of hard brittle gum therefor, so that the edges of the die may first cut through said layer and break the gum on the line of the cut, said coat first acting as an anvil before the gum becomes heated, the outer marginal edge portion of the foil being urged downwardly to embrace the gum at the broken line and the intermarginal portion of said layer being embossed; whereby when the heat takes effect the softened gum may flow into the inner side of the embossed features, the outer margin of the gum coat becoming unitary with the metal foil at said broken line.

12. The combination with a base supporting sheet, of an emblem including an embossed metal foil facing layer having its outer boundary edge turned downwardly, a tough backing layer disposed below the facing layer and having its boundary edge registering with the first edge, and means cooperating with said backing layer and attaching said edges to the sheet, said means including a relatively hard layer which is pressed against the tough layer, said hard layer being raised and depressed to cooperate with the relief portions and depressions of the embossed sheet.

13. The combination of a yieldable extended base sheet, an emblem including an embossed metal foil facing layer having its outer boundary edge portion turned downwardly, a tough backing layer disposed below the facing layer and having its boundary edge registering with the first edge, and means cooperating with said backing layer and attaching said edges to the sheet, said means including a relatively hard layer which is bent upwardly and pressed against the tough layer, said hard layer being provided with raised portions opposite the relief portions of the facing layer, and the base sheet being bent upwardly against the bottom of said hard layer.

14. The combination with a base supporting sheet, of an emblem including an embossed metal foil facing layer having its outer boundary edge portion turned downwardly into attachment with a portion of said sheet, a thin tough backing layer disposed below the facing layer and having its boundary edge registering with the first edge, a layer of hard gum disposed below the tough layer and having a thin boundary edge also registering with said first edge, said hard layer being provided with projections which press the tough layer substantially into the underside of the relief portions of the facing layer, and a layer of unvulcanized rubber at least partly incorporated in the gum and attaching the latter and the registering edges and to said sheet.

15. An ornamental article including in combination with a base of sheet material, an emblem mounted on a portion of said material and including an embossed metal foil facing layer, a thin tough layer closely engaging the first layer, said layers having their outer boundary edges intimately engaged and turned downwardly into engagement with the surface of said material so as to provide an interposed space, and coacting coats of adhesive material disposed in said space and attaching said layers to said surface, one of said coats being pressed adhesively and tightly against the tough layer, and each of said coats having a thin boundary margin which extends outwardly into engagement with said engaging edges.

16. An ornamental article including in combination with a base of yieldable sheet material, an emblem mounted on a portion of said base and including an embossed metal foil facing layer, a thin tough layer closely engaging the first layer, said layers having their outer boundary margins turned downwardly, the edges of said margins being disposed against the surface of the base so as to provide an interposed space, and coacting coats of adhesive material disposed in said space and attaching said layers to said surface, the top member of said coats being pressed adhesively and tightly on the thin layer to urge it against the embossing of the other layer, the bottom member of said coats being adhesively engaged on said surface which latter is bent upwardly thereat, the outer boundary margins of said coats being also turned downwardly, and the last mentioned margin having their edges substantially incorporated with the first mentioned edges.

17. A composite sheet including in combination a facing sheet of embossable metal foil; a layer of thin paper adhered to the back of said sheet; a brittle adhesive coating on said paper, said adhesive being embossable where heated and brittle when cool on said paper, and a coating of another adhesive on the adhesive coat.

18. An ornamental article including in combination a facing sheet of embossed metal foil; a layer of thin paper adhered to the back of said sheet; a brittle adhesive coating on said paper, said adhesive being embossable where heated and brittle where cool; a coating of unvulcanized rubber on the adhesive coat; said sheet paper and coatings forming a composite sheet; and a base of yieldable material larger than the composite sheet and to which said composite sheet is adhered by the rubber; the edges of said facing sheet being turned downwardly around the brittle adhesive and the rubber and extended to the base.

19. An ornamental article including in combination a facing sheet of embossed metal foil; a layer of thin paper adhered to the back of said sheet; a brittle adhesive coating on said paper and embossable where heated and brittle where cool; a coating of unvulcanized rubber applied to said paper; said sheet paper coating forming a composite sheet; a base of yieldable material to which said rubber is adhered; the intramarginal area of the composite sheet including the rubber and the adhesive being embossed, the rubber being depressed where the facing sheet is depressed and raised where the facing sheet is in relief; the base being in raised condition under the embossed part of the composite sheet.

20. An ornamental article including in combination a facing sheet of embossed metal foil; a layer of thin paper adhered to the back of said sheet; a brittle adhesive coating on said paper, said adhesive being embossable where heated and brittle when cool; a coating of unvulcanized rubber on the adhesive coat, said sheet paper and coatings forming a composite sheet; and a base of yieldable material larger than the composite sheet and to which said composite sheet is applied; the edges of said facing sheet being turned downwardly around the brittle adhesive and the rubber; the intra-marginal area of the composite sheet including the rubber and the adhesive being embossed, the rubber being depressed where the facing sheet is depressed and raised where the exposed face of the facing sheet is in relief; the base being in raised condition under the embossed part of the composite sheet.

GEORGE PAPP.